Figure 1:
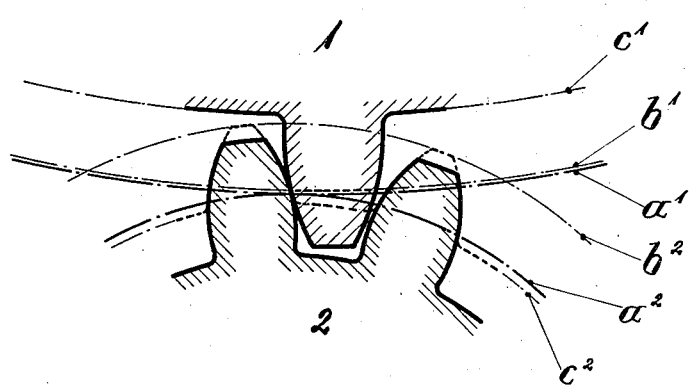

Sept. 2, 1924. 1,506,918
GRAF ALFRED VON SODEN-FRAUNHOFEN
HIGH SPEED TOOTH GEAR
Filed Oct. 12, 1921 2 Sheets-Sheet 2

INVENTOR:
Graf Alfred von Soden-Fraunhofen
by
Attorney.

Patented Sept. 2, 1924.

1,506,918

UNITED STATES PATENT OFFICE.

GRAF ALFRED von SODEN-FRAUNHOFEN, OF FRIEDRICHSHAFEN A. B., GERMANY, ASSIGNOR, BY MESNE ASSIGNMENTS, TO FIRM: ZAHNRADFABRIK AKTIEN-GESELLSCHAFT, OF FRIEDRICHSHAFEN A. B., GERMANY.

HIGH-SPEED TOOTH GEAR.

Application filed October 12, 1921. Serial No. 507,273.

*To all whom it may concern:*

Be it known that I, GRAF ALFRED VON SODEN-FRAUNHOFEN, a citizen of Germany, residing at Friedrichshafen, a. B., Germany, have invented certain new and useful Improvements in High-Speed Tooth Gear, of which the following is a specification.

My invention relates to high speed tooth gears of all kinds and one object of my invention is to provide such gears which run noiselessly and have good wearing qualities.

The principal causes of noisy running in high speed gears are an incorrect form of the teeth, poor machining and wear. These defects can be avoided by correct and exact machining and good attention, assuming, of course, that the form of the teeth be correct. But even with the greatest exactitude there is a squeaking of the gears which is the more pronounced the fewer other noises are produced.

The cause of this squeaking of the gears is not so much the alternation of loading and unloading of the several teeth which vibrate in consequence but rather the change of direction in the gliding of the contacting teeth. At the beginning of the engagement a tooth glides into the gearing until the point of contact has moved past the pitch circle whereupon it glides out of the gearing so that the direction of gliding is continuously reversed from gliding friction, through a point of rest, when the point of contact is in the pitch circle, to another gliding friction.

According to my invention, now, I avoid this change of direction and the shocks it produces, by placing the pitch circle beyond the operating portion of the tooth profile so that the point of contact is either to the right or to the left of the central line. This kind of toothing has never before been applied to high-speed power transmitting gears.

According to my invention, the diameter of the addendum circle of one of two cooperating gear wheels is made less than or, as a maximum, equal to the diameter of the pitch circle. The reduction of the period of contact which results from this reduction of the diameter of the addendum circle is compensated by corresponding selection of the root circle diameter of the teeth or the addendum circle diameter of the cooperating gear wheel so that in any case the period of contact exceeds 1.

In the drawings affixed to this specification and forming part thereof two tooth gears embodying my invention are illustrated diagrammatically by way of example. In the drawings Fig. 1 shows how my improved gearing can be developed from a normal one, Fig. 2 illustrates the new gearing, and Fig. 3 shows a modification.

Figure 2:
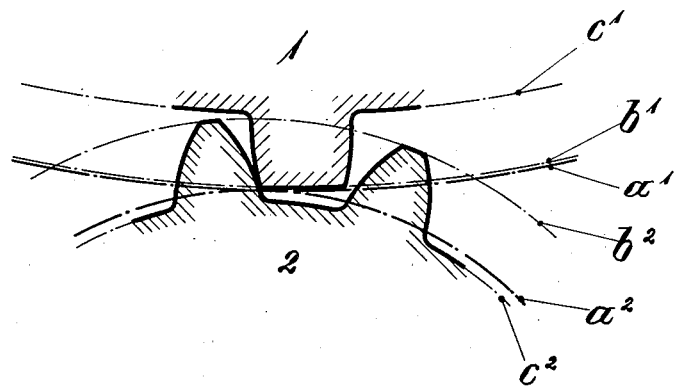

Referring to Fig. 1, 1 and 2 are the meshing gears. $a'$ and $a^2$ are the pitch circles, $b^1$ and $b^2$ the addendum circles, and $c'$ and $c^2$ the root circles, respectively. The addendum circle $b'$ lies within the pitch circle $a^1$.

Figure 3:
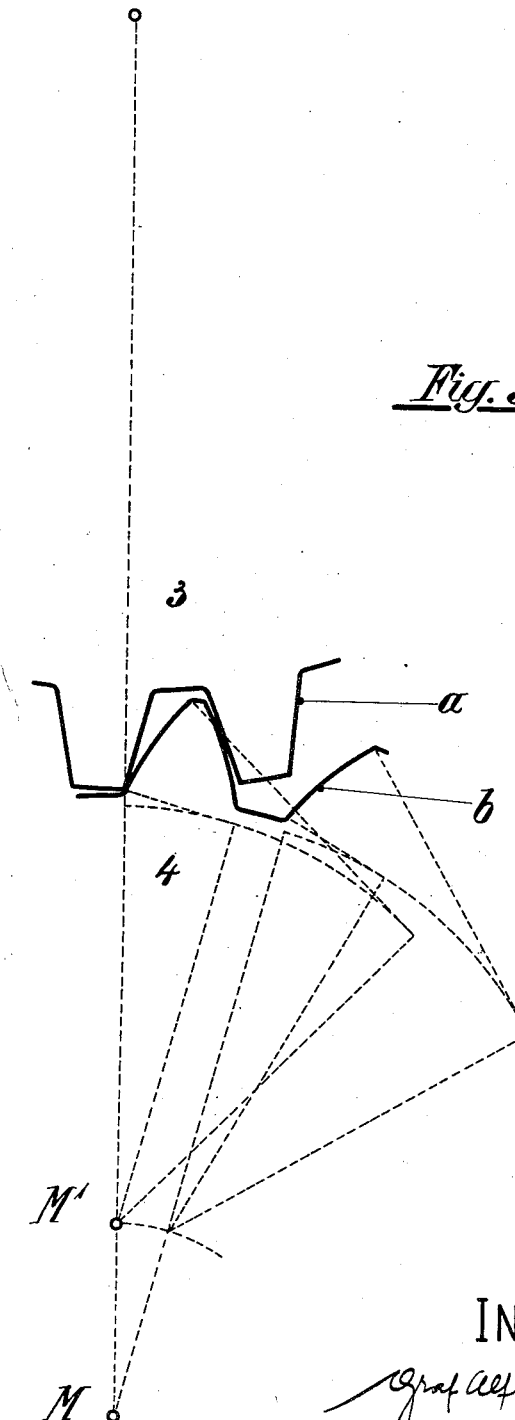

A particularly good gearing which combines the advantages of exact machining possessed by the involute gear with the good wearing qualities of the cycloid gear is illustrated in Fig. 3. The hypo-cycloid portion of the tooth flanks is replaced by straight lines, while in the corresponding epi-cycloid flanks it is replaced by involutes. The wheel 3 has straight flanks $a$, the epi-cycloid-like involute flanks $b$ of wheel 4 are produced by arranging the centre $M'$ of the base circle of the involute of each tooth not in the centre $M$ of the gear but eccentrically to it.

I wish it to be understood that I do not desire to be limited to the exact details of construction shown and described, for obvious modifications will appear to a person skilled in the art.

I claim:

A toothed gearing comprising teeth whose pitch circle lies outside the active portions of the flanks, the hypo-cycloid portions being replaced by straight portions and the epi-cycloid portions of the flanks of the co-operating teeth by involutes.

In testimony whereof I affix my signature.

GRAF ALFRED von SODEN-FRAUNHOFEN.